(12) United States Patent
Fukuzawa et al.

(10) Patent No.: US 10,284,017 B2
(45) Date of Patent: May 7, 2019

(54) COIL DEVICE AND WIRELESS POWER TRANSMISSION DEVICE

(71) Applicant: TDK CORPORATION, Tokyo (JP)

(72) Inventors: Narutoshi Fukuzawa, Tokyo (JP); Ayako Sato, Tokyo (JP); Tsunehiro Saen, Tokyo (JP)

(73) Assignee: TDK CORPORATION, Tokyo (JP)

( * ) Notice: Subject to any disclaimer, the term of this patent is extended or adjusted under 35 U.S.C. 154(b) by 303 days.

(21) Appl. No.: 15/254,331

(22) Filed: Sep. 1, 2016

(65) Prior Publication Data
US 2017/0063163 A1 Mar. 2, 2017

(30) Foreign Application Priority Data

Sep. 2, 2015 (JP) ................. 2015-172823
Aug. 3, 2016 (JP) ................. 2016-152550

(51) Int. Cl.
*H01F 27/42* (2006.01)
*H01F 37/00* (2006.01)
*H01F 38/00* (2006.01)
*H02J 50/12* (2016.01)
*H02J 50/70* (2016.01)
*H02J 50/90* (2016.01)

(52) U.S. Cl.
CPC .............. *H02J 50/12* (2016.02); *H02J 50/70* (2016.02); *H02J 50/90* (2016.02)

(58) Field of Classification Search
CPC ................ B60L 11/182; B60L 2210/30; B60L 2240/36; B60L 2270/147; B60L 2230/10; H01F 27/24; H01F 27/2823; H01F 27/2828; H01F 38/14; H01F 2027/348; H02J 5/005; H02J 50/12; H02J 50/70; H02J 7/0042; H02J 7/025; H02J 17/00; Y02T 10/7005; Y02T 10/7072; Y02T 10/7241; Y02T 10/7088; Y02T 90/12; Y02T 90/122; Y02T 90/14

USPC ........................................................ 307/104
See application file for complete search history.

(56) References Cited

U.S. PATENT DOCUMENTS

| 2009/0034155 A1* | 2/2009 | Devoe ................... H01G 4/232 361/306.3 |
| 2011/0102966 A1* | 5/2011 | Takeoka ................. H01G 2/08 361/301.3 |
| 2014/0175899 A1* | 6/2014 | Miyashita ............... H01F 38/14 307/104 |

FOREIGN PATENT DOCUMENTS

JP 2013-172503 A 9/2013

* cited by examiner

*Primary Examiner* — Rexford N Barnie
*Assistant Examiner* — Toan T Vu
(74) *Attorney, Agent, or Firm* — Oliff PLC (57) ABSTRACT

A coil device and a wireless power transmission device which can detect the happened open fault or short fault reliably in any one of the plurality of capacitor elements constituting the capacitor circuit. Coil device includes coil for power transmission, capacitor circuit connected to coil for power transmission and having a plurality of capacitor elements, conductive metal portion which is disposed close to coil for power transmission, and measuring portion for measuring a voltage or a current generated in metal portion.

12 Claims, 8 Drawing Sheets

COIL DEVICE AND WIRELESS POWER TRANSMISSION DEVICE

The present invention relates a coil device and a wireless power transmission device.

BACKGROUND

In recent years, in electric vehicle, the wireless power transmission technology attracts lots of attention wherein the power is supplied from outside wirelessly without using a power supply cable. In the wireless power transmission technology, the method using a resonance phenomenon between two resonators is becoming the mainstream. The method in which the resonance frequencies between two resonators are approached, an alternating current and voltage near the resonance frequency is applied to the resonators and the resonance phenomenon between two resonators is used has a merit that it is capable of enlarging the distance between power transmission and reception comparing to the electromagnetic induction. In the wireless power transmission technology using the resonance phenomenon, a capacitor circuit is connected to the coil for power transmission and a resonance circuit is formed.

To the capacitor circuit of the charging devices requiring large power transmission such as electric vehicle, a large voltage and current is applied. In order to distribute the application of the large voltage and current and obtain a desired electrostatic capacity, a capacitor circuit is constituted by connecting a plurality of capacitor elements. For example, in Patent Document 1, a coil unit is disclosed wherein a capacitor circuit connected to the coil is constructed by a plurality of capacitor elements.

PATENT DOCUMENTS

Patent Document 1: JP2013-172503A

SUMMARY

However, even if an open fault or a short fault is caused in any one of the plurality of capacitor elements by any reason, the change of the capacitance in the capacitor circuit will be minute and it will be very difficult to detect the fault in the plurality of capacitor elements as long as the remained plurality of capacitor elements which are normal can work.

The present invention is completed in view of the above problems and aims to provide a coil device and a wireless power transmission device which can detect the happened open fault or short fault reliably in any one of the plurality of capacitor elements constituting the capacitor circuit.

The coil device of the present invention comprises a coil for power transmission, a capacitor circuit connected to the coil for power transmission and having a plurality of capacitor elements, a conductive metal portion which is arranged close to the coil for power transmission, and a measuring portion for measuring a voltage or a current generated in the metal portion.

According to the present invention, a conductive metal portion which is arranged close to the coil for power transmission and a measuring portion for measuring a voltage or a current generated in the metal portion are provided. Thus, in response to the minute change of the capacitance when the short fault or open fault is caused in the plurality of capacitor elements, the change of the voltage or current of the metal portion generated through the parasitic capacitance produced between the coil for power transmission and the metal portion can be measured by the measuring portion. Thereby, it is possible to detect the happened open fault or short fault reliably in any one of the plurality of capacitor elements constituting the capacitor circuit.

It is preferred that it is configured that the capacitor circuit has a first capacitor circuit which is connected to one end of the coil for power transmission and a second capacitor circuit which is connected to the other end of the coil for power transmission, and a combined electrostatic capacity of the first capacitor circuit is approximately equal to a combined electrostatic capacity of the second capacitor circuit. According to such a construction, the generated voltage or current of the metal portion will become very low through the parasitic capacitance produced between the coil for power transmission and the conductive metal portion which is arranged close to the coil for power transmission, and the measuring burden of the measuring portion can be decreased. As a result, it can contribute to downsizing and lightening.

It is preferred that each of the plurality of capacitor elements is composed of a multilayer ceramic capacitor, and the capacitor circuit can have a capacitor group in which the plurality of capacitor elements are series-parallel connected. According to such a construction, the change of the capacitance of the capacitor circuit will become large when a short fault is caused in a single multilayer ceramic capacitor. Therefore, the change of the voltage or current generated in the metal portion will become large, and the fault in the plurality of capacitor elements constituting the capacitor circuit can be measured more reliably.

It is preferred that each of the plurality of capacitor elements is composed of a film capacitor, and the capacitor circuit can have a plurality of capacitor portions in which a plurality of capacitor elements are connected in series. According to such a construction, the change of the capacitance of the capacitor circuit will become large when an open fault is caused in a single film capacitor. Therefore, the change of the voltage or current generated in the metal portion will become large, and the fault in the plurality of capacitor elements constituting the capacitor circuit can be measured more reliably.

The wireless power transmission device of the present invention comprises a wireless power feeding device including a power feeding coil device and a wireless power receiving device including a power receiving coil device, at least one of the power feeding coil device and the power receiving coil device is the above coil device. According to the present invention, a wireless power transmission device can be obtained which can measure the happened open fault or short fault in any one of the plurality of capacitor elements constituting the capacitor circuit reliably.

According to the present invention, a coil device and a wireless power transmission device can be provided which can measure the happened open fault or short fault in any one of the plurality of capacitor elements constituting the capacitor circuit reliably.

BRIEF DESCRIPTION OF THE DRAWINGS

FIG. 3b is a cross-sectional view of the coil device taken along cutting line A-A in FIG. 3a.

DETAILED DESCRIPTION OF EMBODIMENTS

Hereinafter, the embodiments of the present invention will be described in detail with reference to the drawings. Further, in the description, same symbol will be used for the same elements or the elements having the same functions and repeated description is omitted.

Figure 1:
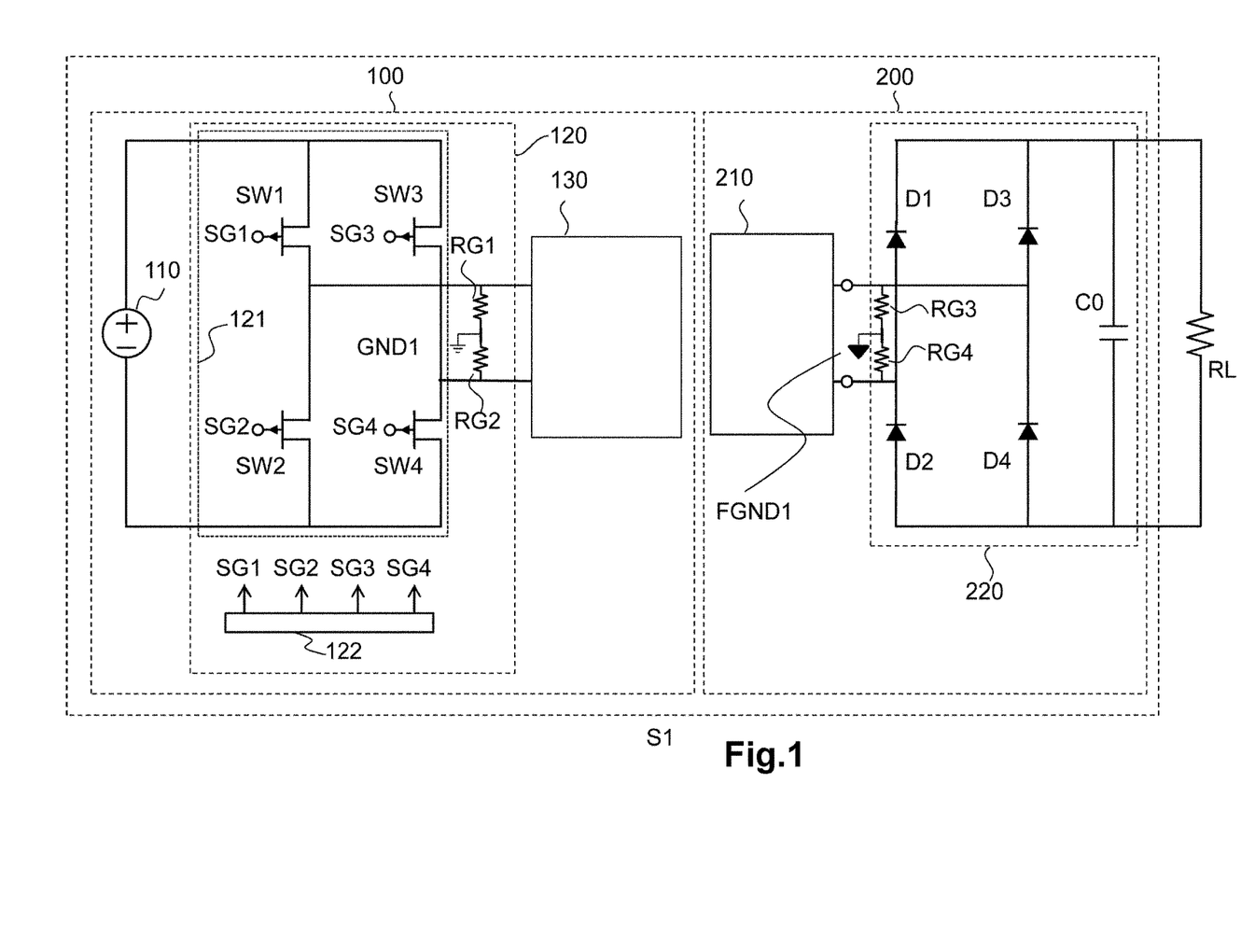
FIG. 1 is a circuit construction diagram showing the wireless power transmission device accompanying with its load wherein the coil device according to the preferable embodiment of the present invention is used.

First, the whole construction of the wireless power transmission device S1 wherein the coil device according to the preferable embodiment of the present invention is used is described with reference to FIG. 1. FIG. 1 is a circuit construction diagram showing the wireless power transmission device accompanying with its load wherein the coil device according to the preferable embodiment of the present invention is used. Further, the coil device according to the preferable embodiment of the present invention can also be used in any one of the power feeding coil device and the power receiving coil device in the wireless power transmission device.

As shown in FIG. 1, wireless power transmission device S1 comprises wireless power feeding device 100 and wireless power receiving device 200. The wireless power transmission device S1 is used in the power feeding equipment for vehicles such as electric vehicle. That is, wireless power feeding device 100 is mounted on the power feeding equipment which is disposed on the ground and wireless power receiving device 200 is mounted in the vehicles.

Wireless power feeding device 100 comprises power supply 110, power conversion circuit 120 and power feeding coil device 130. Power supply 110 supplies a direct current power to power conversion circuit 120. As power supply 110, it is not restricted specifically as long as it outputs direct current power. A direct current power supply which rectifies and smoothes the commercial alternating current power supply, a secondary battery, a solar photovoltaic direct current power supply or a switching power supply device such as a switching converter or the like can be listed.

Power conversion circuit 120 comprises power conversion portion 121 and switch drive portion 122. The power conversion circuit 120 has a function of converting the input direct current power supplied from power supply 110 to an alternating current power. More specifically, as power conversion portion 121, it is composed of a switching circuit in which a plurality of switching elements are bridge connected. In the present embodiment, it turns to be a full bridge-type circuit using four switching elements SW1 to SW4. As switching elements SW1 to SW4, for example, elements such as MOS-FET (Metal Oxide Semiconductor-Field Effect Transistor) or IGBT (Insulated Gate Bipolar Transistor) or the like can be listed. Each of switching elements SW1 to SW4 converts the input direct current power supplied from power supply 110 into an alternating current power by ON/OFF controlling each of switching elements SW1 to SW4 according to the SW controlling signals SG1 to SG4 which are supplied from switch drive portion 122. In addition, in power conversion circuit 120, the output of power conversion portion 121 is connected to ground GND1 through voltage dividing resistors RG1 and RG2. Specifically, voltage dividing resistors RG1 and RG2 which are largely equivalent are connected in parallel to both ends of the output side of power conversion portion 121 and its middle point is connected to ground GND1. In the present example, power conversion circuit 120 is a construction including voltage dividing resistors RG1 and RG2 and ground GND1, but it is not limited by this. Power feeding coil device 130 which will be mentioned in the following can also comprises these constructions. In addition, in the present example, it is constructed in a manner that the output of power conversion portion 121 connects to ground, but it is not limited by this. It can also be constructed in a manner that it connects to ground (not shown in the figures) through two capacitors with equal capacity (not shown in the figures) between power supply 110 and power conversion circuit 120.

Power feeding coil device 130 has a function to supply the alternating current power supplied from power conversion circuit 120 to power receiving coil device 210 which will be mentioned in the following. The power feeding coil device 130 is disposed in the ground or near the ground surface in the power feeding equipment.

Wireless power receiving device 200 comprises power receiving coil device 210 and rectification portion 220.

Power receiving coil device 210 has a function of receiving the alternating current power supplied from power feeding coil device 130. The power receiving coil device 210 is mounted in the lower part of the vehicle.

Rectification portion 220 rectifies the power received by power receiving coil device 210 and outputs to load RL. In the present embodiment, rectification portion 220 is composed of a bridge-type circuit and smoothing condenser CO, wherein four diodes (rectification element) D1 to D4 are full bridge connected in the bridge-type circuit and smoothing condenser CO is connected to the bridge-type circuit in parallel. That is, rectification portion 220 has a function of full-wave rectifying the alternating current power supplied from power receiving coil device 210. Smoothing condenser CO smoothes the rectified voltage to generate a direct current voltage. In addition, the input of rectification portion 220 is connected to frame ground FGND1 of the vehicle through voltage dividing resistor RG3 and RG4. Specifically, voltage dividing resistors RG3 and RG4 which are largely equivalent are connected in parallel to both ends of the input side of rectification portion 220 and its middle point is connected to frame ground FGND1. In the present example, rectification portion 220 is a construction comprising voltage dividing resistors RG3 and RG4 and frame ground FGND1, but it is not limited to be like this. Power receiving coil device 210 can include these constructions.

By having such a construction, power feeding coil device 130 of wireless power feeding device 100 and power receiving coil device 210 of wireless power receiving device 200 face each other and magnetically coupled with each other. The alternating current power supplied to power feeding coil device 130 from power conversion circuit 120 excites an induced electromotive force in power receiving coil device 210 by near-field effect. That is, wireless power transmission device S1 can become true by which power can be transmitted contactlessly from wireless power feeding device 100 to wireless power receiving device 200.

In the following, the construction of the coil device according to the preferable embodiment of the present invention used in power feeding coil device 130 or power receiving coil device 210 mentioned above will be described.

(The First Embodiment)

Figure 2A:
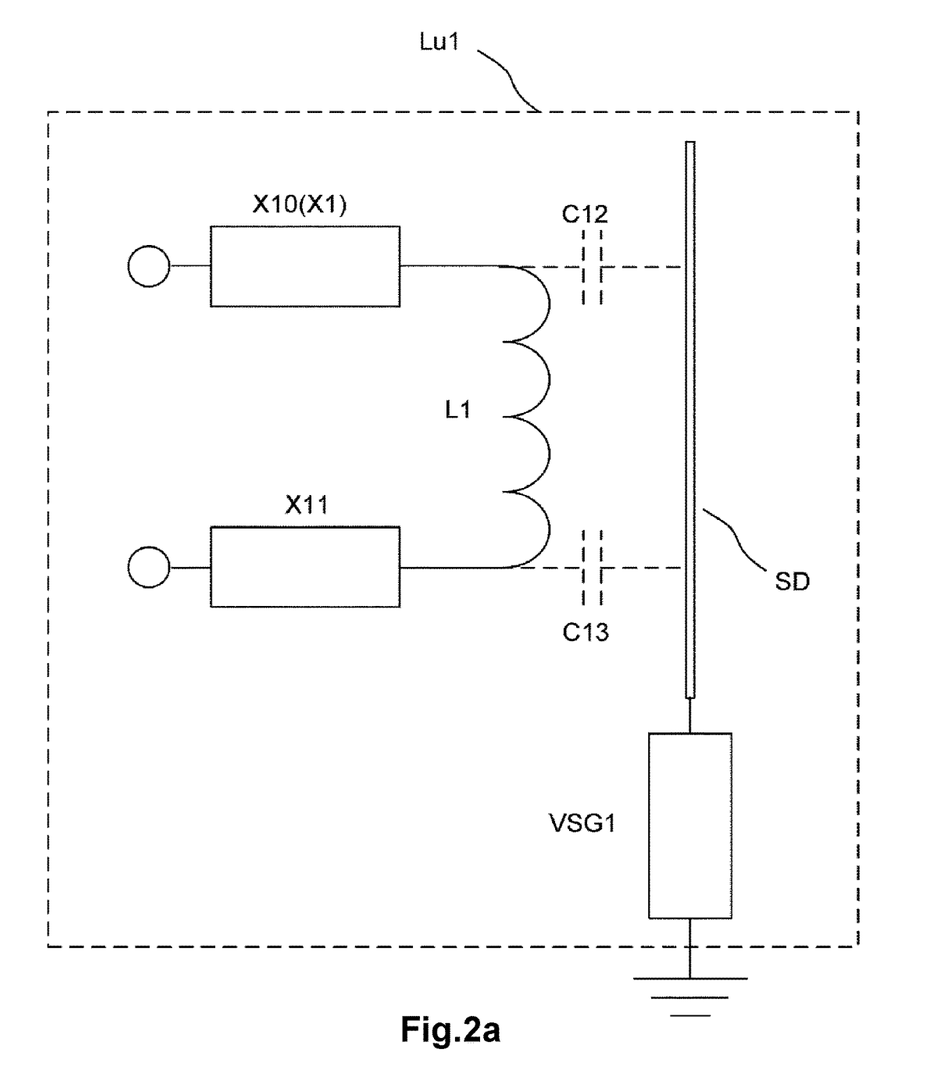
FIG. 2a is a schematic view showing the circuit construction of the coil device according to the first embodiment of the present invention.
Figure 2B:
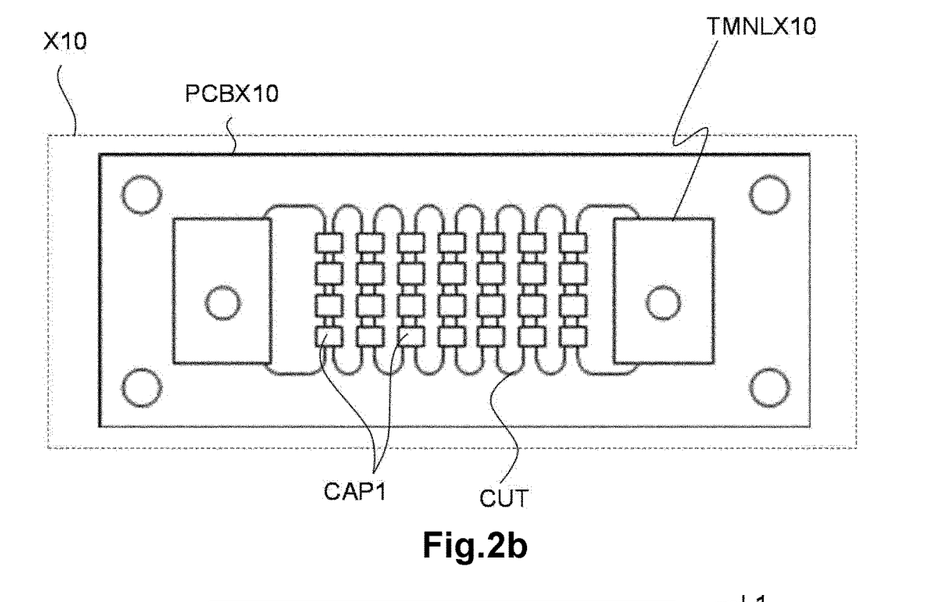
FIG. 2b is a schematic view showing the construction of the first capacitor circuit in the coil device according to the first embodiment of the present invention.
Figure 3A:
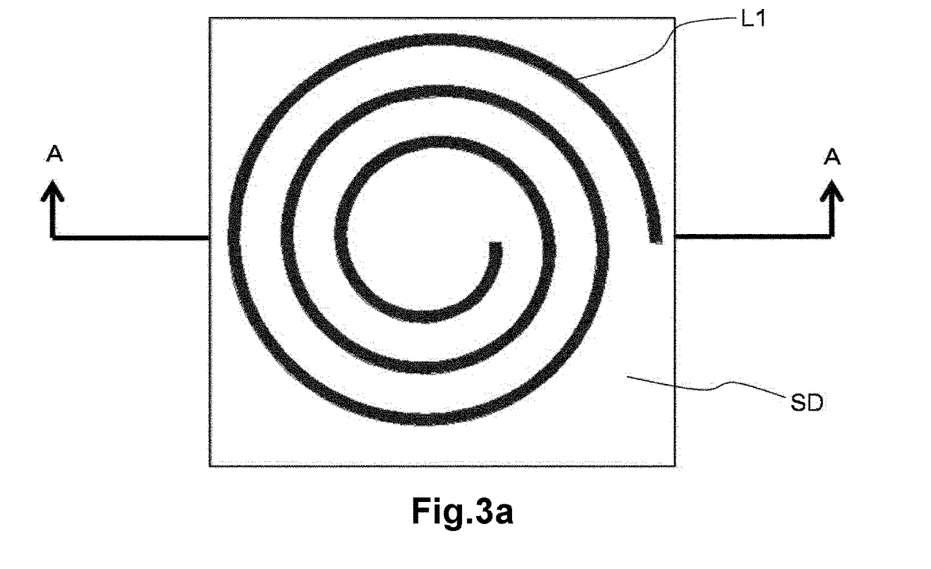
FIG. 3a is a plan view of the coil device according to the first embodiment of the present invention.
Figure 3B:
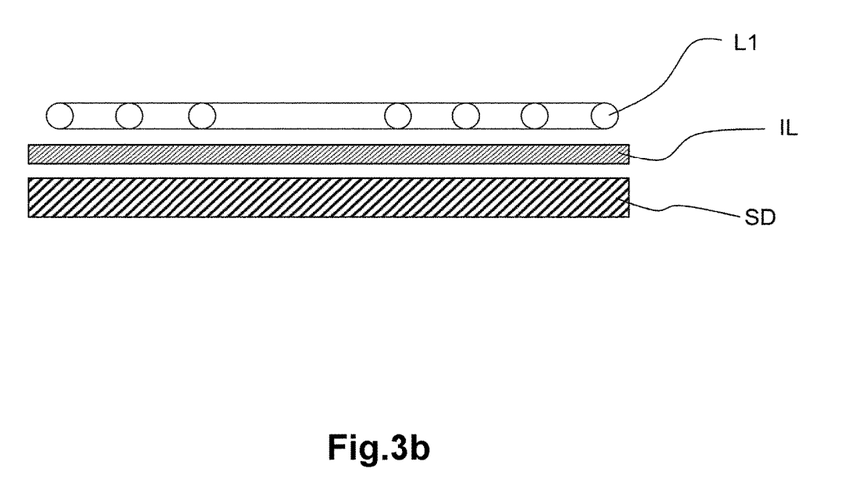

The construction of coil device Lu1 of the first embodiment of the present invention is described specifically referring to FIG. 2 and FIG. 3. FIG. 2a is a schematic view showing the circuit construction of the coil device according to the first embodiment of the present invention. FIG. 2b is a schematic view showing the construction of the first capacitor circuit in the coil device according to the first embodiment of the present invention. FIG. 3a is a plan view of the coil device according to the first embodiment of the present invention. FIG. 3b is a cross-sectional view of the coil device taken along cutting line A-A in FIG. 3a. Further, in FIG. 3a and FIG. 3b, the capacitor circuit is omitted for the convenience in description.

Coil device Lu1 comprises coil for power transmission L1, metal portion SD, capacitor circuit X1 and measuring portion VSG1 as shown in FIG. 2a.

Coil for power transmission L1 is constructed by winding the winding wire composed of the litz wire which is obtained by twisting a plurality of fine conductor element wires together. In the present embodiment, coil for power transmission L1 is a coil with a spiral structure of planar shape which is shown like an approximately circular shape as shown in FIG. 3a. The winding number of coil for power transmission L1 can be properly set according to the distance between coil for power transmission L1 and the opposite coil while the power is transmitted or the desired power transmission efficiency or the like. Further, in the present embodiment, coil for power transmission L1 is shown as an approximately circular shape, but it is not limited by this, it can be shown as various kinds of shapes such as an approximately square shape, an approximately rectangular shape or the like. When coil for power transmission L1 with such an construction is used in power feeding coil device 130 in wireless power transmission device S1, coil for power transmission L1 functions as a power feeding coil, and when coil for power transmission L1 is used in power receiving coil device 210 in wireless power transmission device S1, coil for power transmission L1 functions as a power receiving coil.

In the present embodiment, metal portion SD shows an approximately rectangular parallelepiped as shown in FIG. 3b and is disposed close to the back side of coil for power transmission L1. When coil for power transmission L1 is used in power feeding coil device 130, metal portion SD is disposed in a position farther away from power receiving coil device 210 than coil for power transmission L1 in the direction in which power feeding coil device 130 and power receiving coil device 210 face each other. On the other hand, when coil for power transmission L1 is used in power receiving coil device 210, metal portion SD is disposed in a position farther away from power feeding coil device 130 than coil for power transmission L1 in the direction in which power feeding coil device 130 and power receiving coil device 210 face each other. In another word, metal portion SD is disposed at a side opposite to the side where the power transmission of coil for power transmission L1 is performed while the power is transmitted. In the present embodiment, metal portion SD is disposed close and opposite to coil for power transmission L1. That is, the axis of rotation for the winding wire of coil for power transmission L1 is orthogonal to the main face of metal portion SD. Metal portion SD is constructed by materials with conductivity and has an effect of adsorbing electromagnetic wave, In addition, metal portion SD is disposed close to coil for power transmission L1. Thus, parasitic capacitances C12, C13 are formed between metal portion SD and coil for power transmission L1 as shown in FIG. 2a. In the present embodiment, metal portion SD is disposed close and opposite to coil for power transmission L1, but the essentiality is that it is disposed close to coil for power transmission L1 in order to form parasitic capacitance between metal portion SD and coil for power transmission L1 and it is not necessary to be disposed opposite to coil for power transmission L1. As the material for constituting such metal portion SD, it is preferable to have an electrical conductivity as higher as possible. For example, aluminium, copper, silver or the like can be listed. Further, in the present embodiment, in order to ensure the insulation between coil for power transmission L1 and metal portion SD, insulating member IL is disposed between coil for power transmission L1 and metal portion SD. In addition, a gap can be disposed between coil for power transmission L1 and metal portion SD instead of insulating member IL. From the view point of improving the coupling between coils opposite to coil for power transmission L1, a magnetic body such as a ferrite or the like can be disposed between insulating member IL and metal portion SD. In addition, the present embodiment shows the preferable position relationship of coil for power transmission L1 and metal portion SD when a coil with a spiral structure is used as coil for power transmission L1, but a coil where the winding wire is wound to a spiral-shape (coil with a solenoid structure) around the magnetic body core such as a ferrite or the like can also be used as the coil for power transmission. When the coil with a solenoid structure is used, it is preferable that the metal portion is disposed close in a manner that the main face of the metal portion is parallel to the axis of rotation of the winding wire of the coil.

Capacitor circuit X1 is connected to coil for power transmission L1 and forms a resonance circuit with coil for power transmission L1. Such capacitor circuit X1 has a function of adjusting the resonance frequency of the resonance circuit. In the present embodiment, capacitor circuit X1 comprises first capacitor circuit X10 and second capacitor circuit X11. Further, in the present embodiment, capacitor circuit X1 connects first capacitor circuit X10 and second capacitor circuit X11 to two ends of coil for power transmission L1 respectively, but it is not limited to be like this. It can also connect first capacitor circuit X10 or second capacitor circuit X11 to only one end of coil for power transmission L1.

First capacitor circuit X10 is connected to one end of the winding wire of coil for power transmission L1 as shown in FIG. 2a. That is, first capacitor circuit X10 is connected to coil for power transmission L1 in series. Such first capacitor circuit X10 comprises a plurality of capacitor elements. The construction of first capacitor circuit X10 is shown specifically using FIG. 2b. As shown in FIG. 2b, first capacitor circuit X10 is constructed by mounting a plurality of capacitor elements CAP1 on substrate PCBX10, and a plurality of capacitor elements CAP1 are series-parallel connected between a pair of connecting terminals TMNLX10 on substrate PCBX10. Herein, a plurality of capacitor elements CAP1 are aligned in a matrix form between a pair of connecting terminals TMNLX10 (in the present embodiment, there are totally 28 as 4 rows and 7 lines) and a plurality of capacitor elements CAP1 connect with each other by a plurality of copper foils CUT disposed on substrate PCBX10. Specifically, a plurality of copper foils CUT are disposed in a manner that the adjacent capacitor elements in the row direction (cross direction) connect with each other and the adjacent capacitor elements in the line direction (longitudinal direction) connect with each other and the capacitor elements on two ends in the row direction are connected to a pair of connecting terminals TMNLX10.

Second capacitor circuit X11 is connected to the other end of the winding wire of coil for power transmission L1 as shown in FIG. 2a. That is, second capacitor circuit X11 is connected to coil for power transmission L1 in series. Such second capacitor circuit X11 comprises a plurality of capacitor elements (not shown in the figures). Second capacitor circuit X11 has the same construction as first capacitor circuit X10, thus it is not shown. Second capacitor circuit X11 is constructed by mounting a plurality of capacitor elements on the substrate, and a plurality of capacitor elements are series-parallel connected between a pair of connecting terminals on the substrate.

Measuring portion VSG1 has a function of measuring the voltage or the current generated in metal portion SD. In such measuring portion VSG1, one end is connected to metal portion SD and the other end is connected to reference potential. In this way, measuring portion VSG1 can measure the alternating voltage or current between metal portion SD and reference potential. For example, when coil device Lu1 is used in power feeding coil device 130, the other end of measuring portion VSG1 is connected to ground GND1. Herein, voltage dividing resistors RG1 and RG2 and ground GND1 can be constructed to be included in coil device Lu1 as described above. In such a case, it is constructed in a manner that voltage dividing resistor RG1 and voltage dividing resistor RG2 are connected in series between the end of first capacitor circuit X10 at a side opposite to the side connected to coil for power transmission L1 and the end of second capacitor circuit X11 at a side opposite to the side connected to coil for power transmission L1, and its middle point is connected to ground GND1. On the other hand, when coil device Lu1 is used in power receiving coil device 210, the other end of measuring portion VSG1 is connected to frame ground FGND1. Herein, as stated above, voltage dividing resistors RG3, RG4 and frame ground FGND1 can be constructed to be included in coil device Lu1. In such case, it is constructed in a manner that voltage dividing resistor RG3 and voltage dividing resistor RG4 are connected in series between the end of first capacitor circuit X10 at a side opposite to the side connected to coil for power transmission L1 and the end of second capacitor circuit X11 at a side opposite to the side connected to coil for power transmission L1, and its middle point is connected to frame ground FGND1.

Figure 4:
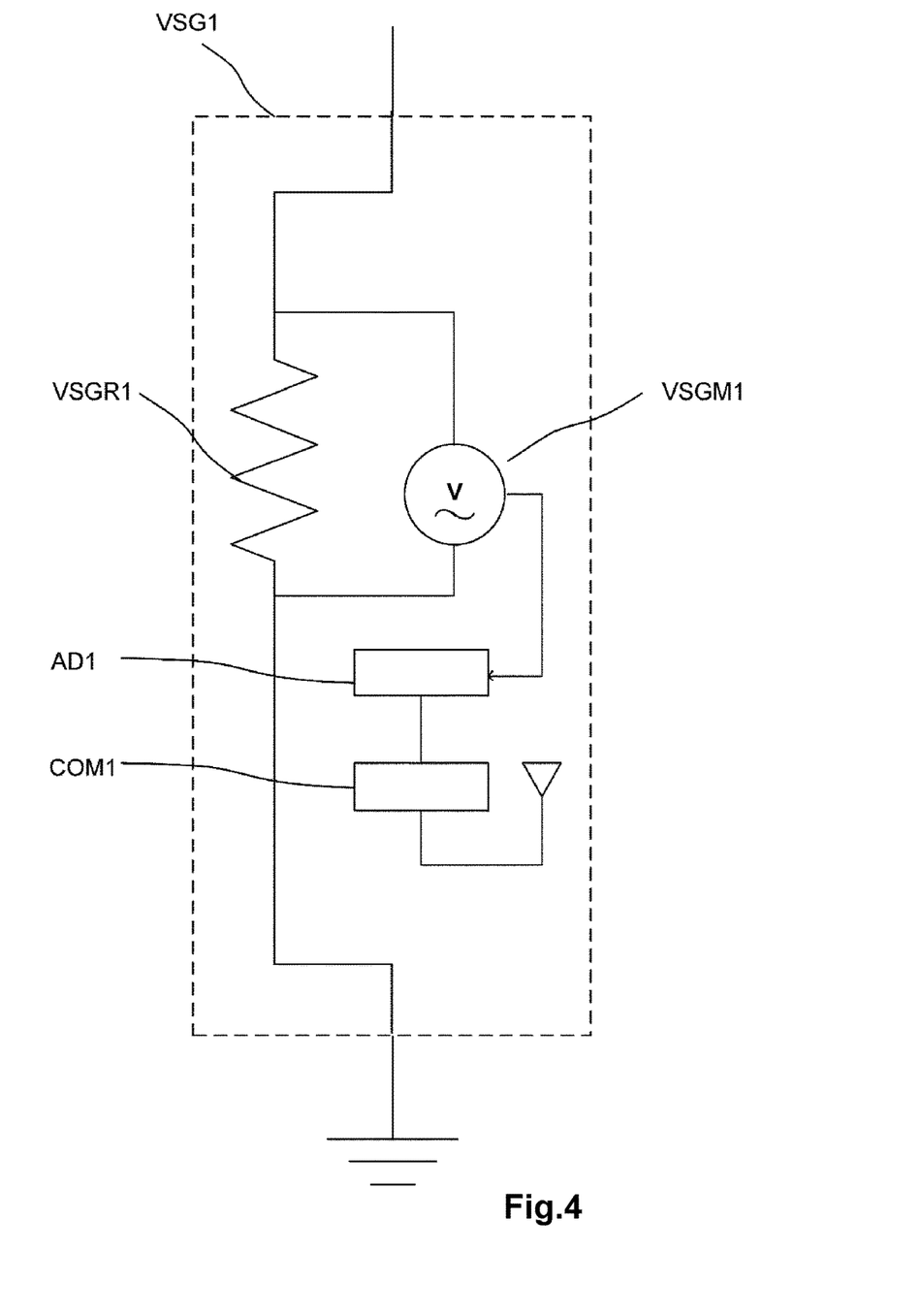
FIG. 4 is a schematic view showing the circuit construction of the measuring portion according to the first embodiment of the present invention.

Herein, the construction of measuring portion VSG1 is described specifically referring to FIG. 4. FIG. 4 is an enlarged schematic view showing the construction of the measuring portion in the coil device according to the first embodiment of the present invention.

As shown in FIG. 4, measuring portion VSG1 comprises resistor VSGR1, alternating voltage meter VSGM1, analog-to-digital converter portion AD1 and wireless communication portion COM1. In resistor VSGR1, one end is connected to metal portion SD and the other end is connected to reference potential. Alternating voltage meter VSGM1 is not restricted specifically as long as alternating voltage meter VSGM1 is an element which can measure the alternating voltage, and it is connected to resistor VSGR1 in parallel. Such alternating voltage meter VSGM1 measures the alternating voltage generated according to the alternating current flowing in resistor VSGR1 and outputs the measured voltage value to analog-to-digital converter portion AD1. Analog-to-digital converter portion AD1 converts the voltage value of the input analog waveform into a voltage value of digital waveform and outputs to wireless communication portion COM1. That is, analog-to-digital converter portion AD1 digitalizes the measured voltage value by alternating voltage meter VSGM1. In this way, wireless communication portion COM1 transmits the input voltage value into the control portion controlling power supply 110 or the control portion controlling switch drive portion 122. The transmitted voltage value can be the alternating voltage value which changes with time, or the effective value of the alternating voltage, or the peak value of the alternating voltage. In addition, in the present embodiment, measuring portion VSG1 measures the voltage using alternating voltage meter VSGM1, but it is not restricted like this. For example, it can convert the alternating voltage generated in Resistor VSGR1 into a direct current voltage using a rectifier or the like and measure the voltage using a direct current voltage meter. Further, in the present embodiment, the voltage of metal portion SD is measured using resistor VSGR1 or alternating voltage meter VSGM1, but it also can be measured without using them. For example, the current of metal portion SD can be measured by using a current transformer and an alternating current meter. In this case, the current value measured and transmitted by the measuring portion can be the alternating current value which changes with time, or the effective value of the alternating current, or the peak value of the alternating current. The essence of measuring portion VSG1 is to measure the voltage or the current of metal portion SD. In addition, in the present embodiment, the measured voltage value or current value is transmitted to the control portion controlling power supply 110 or the control portion controlling switch drive portion 122 in wireless communication portion COM1, but it is not restricted to be like this. It can also be constructed to be transmitted by wired communication.

Hereinabove, the construction of coil device Lu1 is described. In the present embodiment, coil device Lu1 at least comprises coil for power transmission L1, metal portion SD close to coil for power transmission L1, capacitor circuit X1 composed of a plurality of capacitor elements connected to coil for power transmission L1, and measuring portion VSG1 for measuring the voltage or the current of metal portion SD, but it is not necessary to be physically contained in one cabinet. For example, coil device Lu1 can be constructed in a manner that coil for power transmission L1, metal portion SD, capacitor circuit X1, measuring portion VSG1 are contained in one cabinet, it can also be constructed in a manner that coil for power transmission L1, metal portion SD and capacitor circuit X1 are contained in a cabinet and measuring portion VSG1 is contained in the cabinet for containing power supply 110 or power conversion circuit 120. Further, coil device Lu1 can also be constructed in a manner that a part of the construction of measuring portion VSG1 (Resistor VSGR1, alternating voltage meter VSGM1, analog-to-digital converter portion AD1) are contained in a cabinet together with coil for power transmission L1, metal portion SD and capacitor circuit X1, and the rest part of the construction of measuring portion VSG1 is contained in the cabinet for containing power supply 110 or power conversion circuit 120. Herein, metal portion SD can form a part of the cabinet.

Hereinafter, the measuring behavior for voltage or current of measuring portion VSG1 will be described specifically. As described above, parasitic capacitances C12 and C13 are formed between coil for power transmission L1 and metal portion SD which is disposed close to coil for power transmission L1. At this time, a potential difference will be generated between the voltage generated through parasitic capacitance C12 between one end of the winding wire of coil for power transmission L1 and metal portion SD and the voltage generated through parasitic capacitance C13 between the other end of the winding wire of coil for power transmission L1 and metal portion SD according to the difference of the combined electrostatic capacity of first capacitor circuit X10 and the combined electrostatic capacity of second capacitor circuit X11. Therefore, an alternating voltage based on the potential difference will be generated according to the frequency of the provided alternating voltage from power conversion circuit 120 between metal portion SD and the reference potential. Thereby, the alternating current flows into measuring portion VSG1 because of the alternating voltage and the alternating voltage or current generated in metal portion SD can be measured. In this state, if a part of the plurality of capacitor elements constituting first capacitor circuit X10 or second capacitor circuit X11 is out of order and the difference between the combined electrostatic capacity of first capacitor circuit X10 and the combined electrostatic capacity of second capacitor circuit X11 changes, a potential difference which is different from that before the fault happened will be generated according to the increased or decreased capacity caused by the fault in the voltage generated through parasitic capacitance C12 between one end of the winding wire of coil for power transmission L1 and metal portion SD and the voltage generated through parasitic capacitance C13 between the other end of the winding wire of coil for power transmission L1 and metal portion SD. Therefore, an alternating voltage based on the potential difference will be generated between metal portion SD and the reference potential, and an alternating current flows into measuring portion VSG1 because of the alternating voltage and the alternating voltage generated in metal portion SD can be measured. That is, the voltage or current measured by measuring portion VSG1 is measured as a value different from that before the fault happened in the capacitor element.

In this way, the voltage or the current between metal portion SD and the reference potential changes before and after the fault of the capacitor element happened. That is, the occurrence of open fault or short fault in a plurality of capacitor elements constituting first capacitor circuit X10 or second capacitor circuit X11 can be measured reliably by detecting the voltage or the current generated in metal portion SD using measuring portion VSG1.

As described above, coil device Lu1 according to the present embodiment, comprises conductive metal portion SD disposed close to coil for power transmission L1, measuring portion VSG1 for measuring a voltage or a current generated in metal portion SD. Therefore, the change of the voltage or the current of metal portion SD generated through parasitic capacitances C12 and C13 which are produced between coil for power transmission L1 and metal portion SD can be detected by measuring portion VSG1 according to the minute change of the capacitance when a short fault or an open fault is caused in a plurality of capacitor elements. Therefore, the occurrence of open fault or short fault in any one of the plurality of capacitor elements constituting capacitor circuit X1 can be measured reliably.

(The Second Embodiment)

In the following, the coil device according to the second embodiment of the present invention is described. The construction of the coil device according to the second embodiment is the same as coil device Lu1 according to the first embodiment. In the coil device according to the second embodiment, a combined electrostatic capacity of first capacitor circuit X10 connected to one end of coil for power transmission L1 is approximately equal to a combined electrostatic capacity of second capacitor circuit X11 connected to the other end of coil for power transmission L1. Herein, in an ideal state, it is preferable that a combined electrostatic capacity of first capacitor circuit X10 and a combined electrostatic capacity of second capacitor circuit X11 is the same, however, the differences caused by the tolerance of a plurality of capacitor elements constituting first and second capacitor circuit X10 and X11 or the errors produced during the manufacturing of the a plurality of capacitor elements or the like are also contained in the range of the 'approximately equal'.

As shown in the present embodiment, when the combined electrostatic capacity of first capacitor circuit X10 and the combined electrostatic capacity of second capacitor circuit X11 are approximately equal, the potential difference between the voltage of metal portion SD generated through parasitic capacitance C12 between one end of coil for power transmission L1 and metal portion SD and the voltage of metal portion SD generated through parasitic capacitance C13 between the other end of coil for power transmission L1 and metal portion SD will be very small. That is, the alternating voltage or current between metal portion SD and reference potential will be very small. Thereby, resistor VSGR1 and alternating voltage meter VSGM1 with a low withstand performance or a low heat resistance performance can be used for constituting measuring portion VSG1 and measuring portion VSG1 can be downsized and lightening. In addition, if the alternating voltage or current between metal portion SD and reference potential is very small, the voltage or the current generated in metal portion SD measured by measuring portion VSG1 before the happening of the fault can be regarded as 0 substantially. Thus, when fault is caused in the plurality of capacitor elements constituting first and second capacitor circuit X10 and X11, the voltage or the current generated in metal portion SD measured by measuring portion VSG1 will change from 0. Therefore, the accuracy of the detection of the fault in the plurality of capacitor elements constituting first and second capacitor circuit X10 and X11 can be improved.

As stated above, the coil device according to the present embodiment is constructed in a manner that capacitor circuit X1 comprises first capacitor circuit X10 connected to one end of coil for power transmission L1 and second capacitor circuit X11 connected to the other end of coil for power transmission L1 and a combined electrostatic capacity of first capacitor circuit X10 is approximately equal to a combined electrostatic capacity of second capacitor circuit X11. Therefore, the generated voltage or current of metal portion SD will be very low through parasitic capacitances C12 and C13 which are generated between coil for power transmission L1 and conductive metal portion SD disposed close to coil for power transmission L1. The measuring burden of measuring portion VSG1 can be decreased and as a result, it can contribute to the downsizing and lightening.

(The Third Embodiment)

Figure 5:
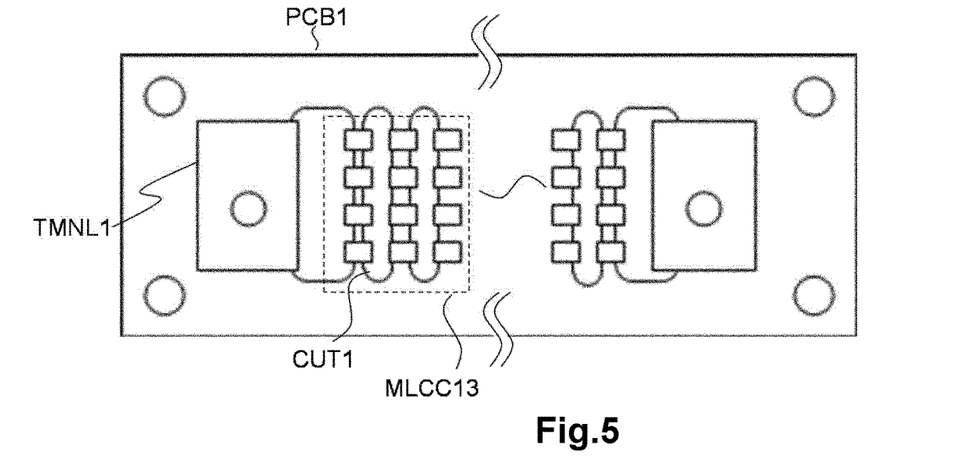
FIG. 5 is a schematic view showing the construction of the capacitor circuit according to the third embodiment of the present invention.

Hereinafter, the coil device according to the third embodiment of the present invention is described specifically referring to FIG. 5. FIG. 5 is a schematic view showing the construction of the first capacitor circuit in the coil device according to the third embodiment of the present invention. The construction of the coil device according to the third embodiment is the same as coil device Lu1 according to the first embodiment. The coil device according to the third embodiment is different from that of the first embodiment in the point that the constructions of a plurality of capacitor elements CAP1 constituting first and second capacitor circuits X10 and X11 (capacitor circuit X1) are different. In addition, as the constructions of first capacitor circuit X10 and second capacitor circuit X11 are the same, thus, only the construction of first capacitor circuit X10 will be described here.

First capacitor circuit X10 is constituted by mounting a plurality of capacitor elements CAP1 on substrate PCB1 as the same way as the first embodiment. A plurality of capacitor elements CAP1 are series-parallel connected between a pair of connecting terminals TMNL1 on substrate PCB1. Herein, a plurality of capacitor elements CAP1 are aligned in a matrix form between a pair of connecting terminals TMNL1 and a plurality of capacitor elements CAP1 connect with each other by a plurality of copper foils CUT1 disposed on substrate PCB1. Specifically, as shown in FIG. 5, a plurality of copper foils CUT1 are disposed in a manner that the adjacent capacitor elements in the row direction (cross direction) connect with each other and the adjacent capacitor elements in the line direction (longitudinal direction) connect with each other and the capacitor elements on two ends in the row direction are connected to a pair of connecting terminals TMNL1. Thereby, first capacitor circuit X10 comprises capacitor group MLCC13 in which a plurality of capacitor elements CAP1 are series-parallel connected. In addition, in the present embodiment, a plurality of capacitor elements CAP1 are mounted on one surface of one substrate, but it is not limited by this. They can be mounted on both surfaces of one substrate and they can also be mounted on a plurality of substrates respectively. Herein, when a plurality of capacitor elements CAP1 are mounted on two surfaces of one substrate or on a plurality of substrates respectively, it is preferred to have a capacitor group in which a plurality of capacitor elements CAP1 mounted on each surface or substrate are all series-parallel connected. However, it also can be a construction having a capacitor group in which a plurality of capacitor elements CAP1 mounted on at least any one of the surfaces or substrates are series-parallel connected.

In the present embodiment, each of the plurality of capacitor elements CAP1 is composed of a multilayer ceramic capacitor. Herein, the most frequent fault mode in the multilayer ceramic capacitor is short mode. When multilayer ceramic capacitors are used in the plurality of capacitor elements CAP1, a plurality of capacitor elements CAP1 are preferred to be a circuit construction where the combined electrostatic capacity of capacitor circuit X1 will change greatly due to the short fault. In the present embodiment, capacitor circuit X1 comprises capacitor group MLCC13 where a plurality of capacitor elements CAP1 are series-parallel connected. Thus, even if a short fault occurs in one of the capacitor elements in capacitor group MLCC13, the combined electrostatic capacity of capacitor circuit X1 will change greatly and the alternating voltage between metal portion SD and the reference potential will change greatly. That is, the fault of a plurality of capacitor elements CAP1 constituting capacitor circuit X1 can be measured reliably.

As described above, in the coil device of the present embodiment, each of the plurality of capacitor elements CAP1 is composed of a multilayer ceramic capacitor, and capacitor circuit X1 comprises capacitor group MLCC13 in which a plurality of capacitor elements CAP1 are series-parallel connected. According to such a construction, when a short fault is caused in a single multilayer ceramic capacitor, the change of the electrostatic capacity of capacitor circuit X1 will be great. Thus, the change of the voltage generated in metal portion SD will be great and the fault in a plurality of capacitor elements CAP1 constituting capacitor circuit X1 can be measured more reliably.

(The Fourth Embodiment)

Figure 6:
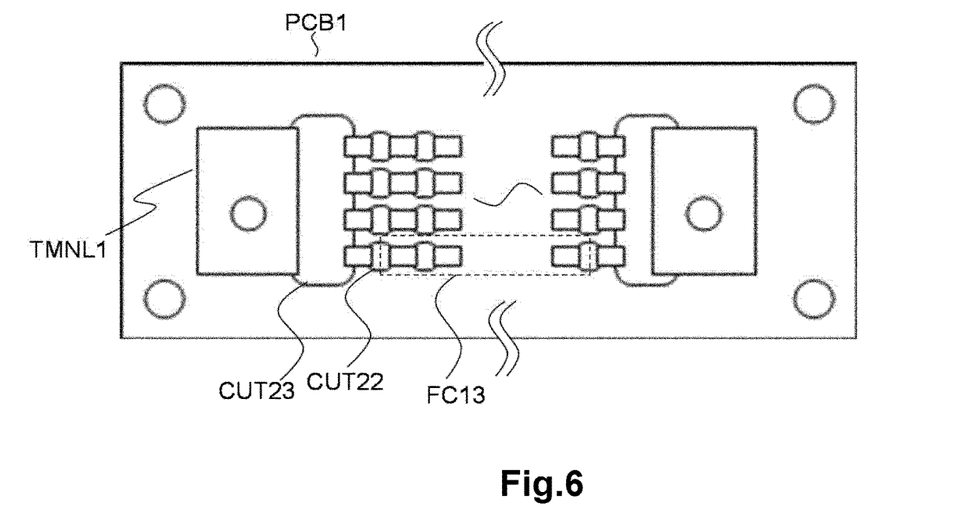
FIG. 6 is a schematic view showing the construction of the capacitor circuit according to the fourth embodiment of the present invention.

Hereinafter, the coil device according to the fourth embodiment of the present invention is described specifically referring to FIG. 6. FIG. 6 is a schematic view showing the construction of the first capacitor circuit in the coil device according to the fourth embodiment of the present invention. The construction of the coil device according to the fourth embodiment is the same as coil device Lu1 according to the first embodiment. The coil device according to the fourth embodiment is different from that of the first embodiment in the point that the connecting constructions of a plurality of capacitor elements CAP1 constituting first and second capacitor circuits X10 and X11 (capacitor circuit X1) are different. In addition, as the constructions of first capacitor circuit X10 and second capacitor circuit X11 are the same, thus, only the construction of first capacitor circuit X10 will be described here.

First capacitor circuit X10 is constituted by mounting a plurality of capacitor elements CAP1 on substrate PCB1 as the same way as the first embodiment. A plurality of capacitor elements CAP1 are connected in series between a pair of connecting terminals TMNL1 on substrate PCB1. Herein, a plurality of capacitor elements CAP1 are aligned in a matrix form between a pair of connecting terminals TMNL1 and a plurality of capacitor elements CAP1 connect with each other by a plurality of copper foils CUT22 and a pair of copper foils CUT23 disposed on substrate PCB1. Specifically, as shown in FIG. 6, a plurality of copper foils CUT22 are disposed in a manner that the adjacent capacitor elements in the row direction (cross direction) connect with each other in series, and the pair of copper foils CUT23 are disposed in a manner that the capacitor elements on two ends in the row direction are connected to the connecting terminals TMNL1. However, in the present embodiment, a plurality of copper foils CUT22 adjacent to each other in line direction are disposed separately without contacting with each other and are not electrically connected directly. Thereby, first capacitor circuit X10 comprises a plurality of capacitor portion FC13 in which a plurality of capacitor elements CAP1 are connected in series. In addition, in the present embodiment, a plurality of capacitor elements CAP1 are mounted on one surface of one substrate, but it is not limited by this. They can be mounted on both surfaces of one substrate and they can also be mounted on a plurality of substrates respectively. Herein, when a plurality of capacitor elements CAP1 are mounted on two surfaces of one substrate or on a plurality of substrates respectively, it is preferred to have a plurality of capacitor portions FC13 in which a plurality of capacitor elements CAP1 mounted on each surface or substrate are connected in series. However, it also can be a construction having a plurality of capacitor portions FC13 in which a plurality of capacitor elements CAP1 mounted on at least any one of the surfaces or substrates are connected in series.

In the present embodiment, each of the plurality of capacitor elements CAP1 is composed of a film capacitor. Herein, the most frequent fault mode in the film capacitor is open mode. When film capacitors are used in a plurality of capacitor elements CAP1, a plurality of capacitor elements CAP1 are preferred to be a circuit construction where the combined electrostatic capacity of capacitor circuit X1 will change greatly due to the open fault. In the present embodiment, capacitor circuit X1 comprises a plurality of capacitor portion FC13 in which a plurality of capacitor elements are connected in series. Thus, even if an open fault occurs in one of the capacitor elements in capacitor portion FC13, the combined electrostatic capacity of capacitor circuit X1 will change greatly and the alternating voltage between metal portion SD and the reference potential will change greatly. That is, the fault of a plurality of capacitor elements CAP1 constituting capacitor circuit X1 can be measured reliably.

As described above, in the coil device of the present embodiment, each of the plurality of capacitor elements CAP1 is composed of a film capacitor, and capacitor circuit X1 comprises a plurality of capacitor portion FC13 in which a plurality of capacitor elements CAP1 are connected in series. According to such a construction, when an open fault is caused in a single film capacitor, the change of the electrostatic capacity of capacitor circuit X1 will be great. Thus, the change of the voltage or the current generated in metal portion SD will be great and the fault in a plurality of capacitor elements CAP1 constituting capacitor circuit X1 can be measured more reliably.

(The Fifth Embodiment)

Figure 7:
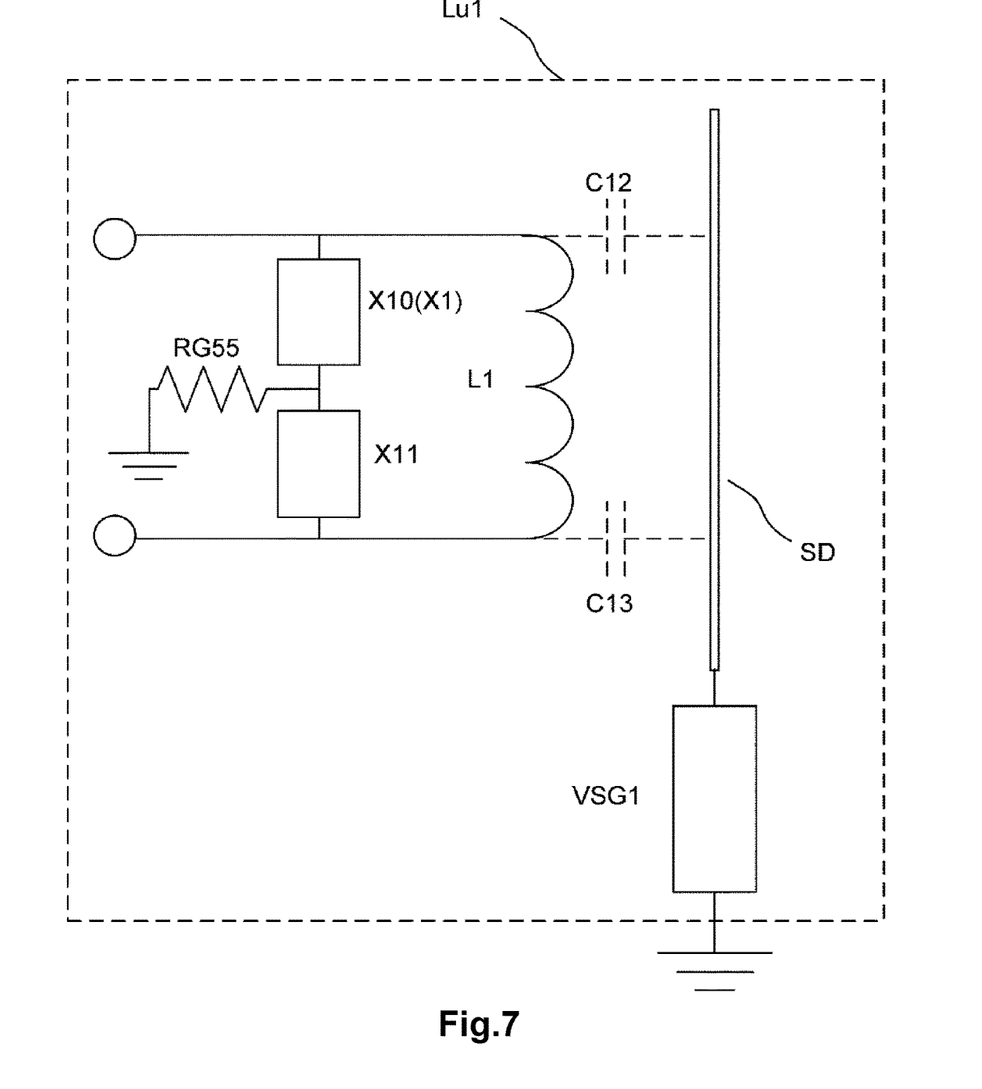
FIG. 7 is a schematic view showing the circuit construction of the coil device according to the fifth embodiment of the present invention.

Hereinafter, the coil device Lu5 according to the fifth embodiment of the present invention is described specifically referring to FIG. 7. FIG. 7 is a schematic view showing the circuit construction of the coil device according to the fifth embodiment of the present invention. Coil device Lu5 comprises coil for power transmission L1, metal portion SD, capacitor circuit X5 and measuring portion VSG1 as shown in FIG. 7. The constructions of coil for power transmission L1, metal portion SD and measuring portion VSG1 are the same as coil device Lu1 according to the first embodiment. Coil device Lu5 according to the fifth embodiment is different from that of the first embodiment in the point that it comprises capacitor circuit X5 for substituting capacitor circuit X1. Hereinafter, the different point with the first embodiment will be described as the focus.

Capacitor circuit X5 is connected to coil for power transmission L1 and forms a resonance circuit with coil for power transmission L1 as the same as capacitor circuit X1. Such capacitor circuit X5 has a function of adjusting the resonance frequency of the resonance circuit. In the present embodiment, capacitor circuit X5 comprises first capacitor circuit X50 and second capacitor circuit X51.

In first capacitor circuit X50, one end is connected to one end of coil for power transmission L1, in second capacitor circuit X51, one end is connected to the other end of coil for power transmission L1. In this point, first capacitor circuit X50 and second capacitor circuit X51 are the same as first capacitor circuit X10 and second capacitor circuit X11 according to the first embodiment. The different point from the first embodiment lies in that the other end of first capacitor circuit X50 and the other end of second capacitor circuit X51 are connected to each other and the connecting middle point of first capacitor circuit X50 and second capacitor circuit X51 is connected to reference potential through resistor RG55. That is, in the present embodiment, first capacitor circuit X50 and second capacitor circuit X51 are connected to coil for power transmission L1 in parallel. Further, the constructions of a plurality of capacitor elements contained in first and second capacitor circuits X50 and X51 are the same as those of a plurality of capacitor elements CAP1 contained in first and second capacitor circuits X10 and X11 of the first embodiment, thus, the description is omitted. Further, it is preferred to be constructed in a manner that the combined electrostatic capacity of first capacitor circuit X50 and the combined electrostatic capacity of second capacitor circuit X51 are approximately equal. In such a case, the alternating voltage or the alternating current between metal portion SD and the reference potential will decrease and the measuring burden of measuring portion VSG1 can be reduced.

As described above, the present embodiment is the same embodiment as the first embodiment except that capacitor circuit X5 is connected in parallel relative to coil for power transmission L1. That is, coil device Lu5 according to the present embodiment comprises conductive metal portion SD disposed close to coil for power transmission L1 and measuring portion VSG1 for measuring the voltage or the current generated in metal portion SD. Therefore, the change of the voltage or the current of metal portion SD generated through parasitic capacitances C12 and C13 produced between coil for power transmission L1 and metal portion SD can be detected by measuring portion VSG1 according to the minute change of the capacitance when a short fault or an open fault is caused in the plurality of capacitor elements constituting capacitor circuit X5. Therefore, the occurrence of open fault or short fault in any one of the plurality of capacitor elements constituting capacitor circuit X5 can be measured reliably.

In addition, in the first to the fourth embodiments, the embodiments wherein capacitor circuit X1 is connected in series relative to coil for power transmission L1 are described. In the fifth embodiment, the embodiment wherein capacitor circuit X5 is connected in parallel relative to coil for power transmission L1 is described. However, even if a capacitor circuit forming a resonance circuit together with coil for power transmission L1 is connected in series and parallel relative to coil for power transmission L1, the same function and effect as the above mentioned embodiment can be obtained.

Hereinafter, the effect that the short fault can be measured reliably happened in any one of a plurality of capacitor elements constituting the capacitor circuit according to the embodiments mentioned above will be described specifically by Examples 1 to 3.

Figure 8:
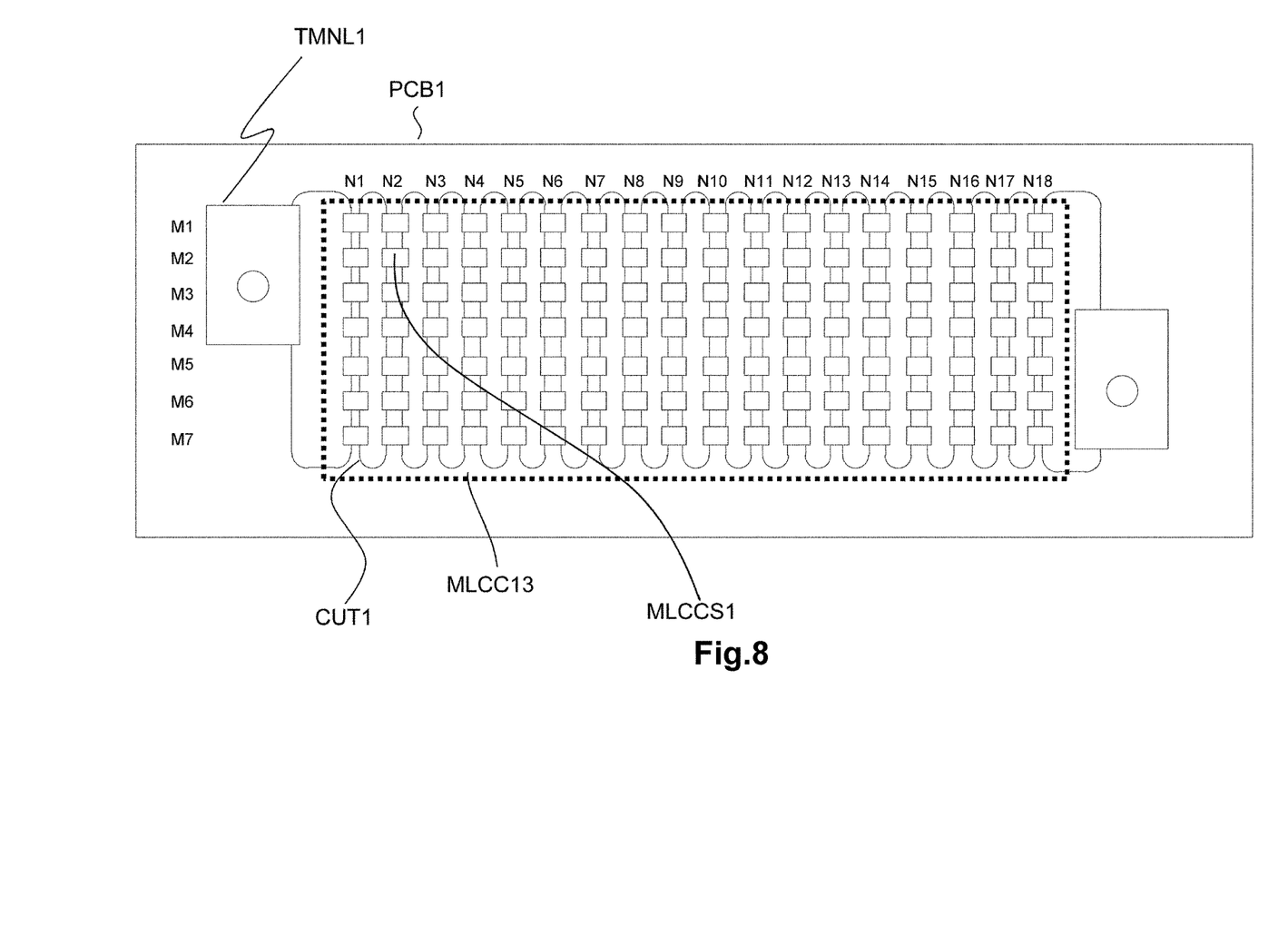
FIG. 8 is a schematic view showing the construction of the first capacitor circuits according to Examples 1 to 4 of the present invention.

As Examples 1 to 3, wireless power transmission device S1 wherein the coil device according to the above third embodiment is used in power feeding coil device 130 and power receiving coil device 210 was used. In each of Examples, the inductance of the power feeding coil of power feeding coil device 130 was set as 600 uH, metal portion SD of power feeding coil device 130 was set as aluminium with a thickness of 2 mm, the plurality of capacitor elements constituting first and second capacitor circuits X10 and X11 of power feeding coil device 130 were set as multilayer ceramic capacitors with single electrostatic capacity of 33 nF, the combined electrostatic capacities of first and second capacitor circuits X10 and X11 of power feeding coil device 130 were set as 12.8 nF respectively, the inductance of the power receiving coil of power receiving coil device 210 was set as 85 uH, metal portion SD of power receiving coil device 210 was set as aluminium with a thickness of 2 mm, the plurality of capacitor elements constituting first and second capacitor circuits X10 and X11 of power receiving coil device 210 were set as multilayer ceramic capacitors with a single electrostatic capacity of 33 nF, and the combined electrostatic capacities of first and second capacitor circuits X10 and X11 of power receiving coil device 210 were set as 90 nF respectively. Herein, in order to describe the places of the faults in the capacitor element in a manner which can be understood more easily, the construction of first capacitor circuit X10 of power feeding coil device 130 in each of Examples was shown in FIG. 8. FIG. 8 is a schematic view showing the construction of the first capacitor circuits of the power feeding coil device in each of Examples. As shown in FIG. 8, in first capacitor circuit X10 of power feeding coil device 130 in each of Examples, a plurality of capacitor elements CAP1 were aligned in a matrix form between a pair of connecting terminals TMNL1 on substrate PCB (18 in series and 7 in parallel) and constituted capacitor group MLCC13 in which a plurality of capacitor elements CAP1 are series-parallel connected by a plurality of copper foils CUT1. In FIG. 8, relative to capacitor group MLCC13, serial addresses were expressed using Number N1 to N18 in the serial direction and parallel addresses were expressed using Number M1 to M7 in the parallel direction. For example, if a short fault is caused in the multilayer ceramic capacitor MLCCS1 represented by a serial address of N2 and a parallel address of M2 in capacitor group MLCC13, the multilayer ceramic capacitors represented with parallel addresses of M1 and M3 to M7 in a serial address of N2 would not function as a capacitor element. That is, a large electrostatic capacity change will be caused by a short fault in a single multilayer ceramic capacitor.

In addition, in each example, load RL was set as 37Ω, the alternating voltage supplied from power conversion circuit 120 to the power feeding coil of power feeding coil device 130 was set as 400V, and the frequency of the alternating voltage was adjusted in a manner that a transmitted electrical power towards load RL becomes 3.3 kW. Further, one end of measuring portion VSG1 in each example was connected to metal portion SD and the other end was connected to the reference potential.

For these examples 1 to 3, the power transmission from wireless power feeding device 100 to wireless power receiving device 200 were started and if the effective value of the alternating voltage generated in metal portion SD was measured by measuring portion VSG1, the result was 0.2V in each example. That is, the effective value of the alternating voltage was a voltage value which becomes a standard in the state without fault in the plurality of capacitor elements.

Then, the power transmission from wireless power feeding device 100 to wireless power receiving device 200 was stopped. In Example 1, the multilayer ceramic capacitor represented by a serial address of N2 and a parallel address of M2 in first capacitor circuit X10 was made to be short. In Example 2, the multilayer ceramic capacitor represented by a serial address of N2 and a parallel address of M2 in first capacitor circuit X10, and the multilayer ceramic capacitor represented by a serial address of N3 and a parallel address of M2 were made to be short. In Example 3, the multilayer ceramic capacitor represented by a serial address of N2 and a parallel address of M2 in first capacitor circuit X10, the multilayer ceramic capacitor represented by a serial address of N3 and a parallel address of M2, and the multilayer ceramic capacitor represented by a serial address of N4 and a parallel address of M2 were made to be short. In such a state, the power transmission from wireless power feeding device 100 to wireless power receiving device 200 was restarted and the effective value of the alternating voltage generated in metal portion SD was measured by measuring portion VSG1. The measured results of each example were shown in Table 1.

TABLE 1

|  | The number of faults in the capacitor element | Location of the short fault | A combined electrostatic capacity of the first capacitor circuit (nF) | A voltage value of the metal portion (Vrms) |
| --- | --- | --- | --- | --- |
| — | 0 | — | 12.8 | 0.2 |
| Example 1 | 1 | N2M2 | 13.6 | 26.5 |
| Example 2 | 2 | N2M2 + N3M2 | 14.4 | 62.0 |
| Example 3 | 3 | N2M2 + N3M2 + N4M2 | 15.4 | 105.7 |

As shown in Table 1, in Example 1, even though the number of faults in a plurality of capacitor elements is 1, the combined electrostatic capacity of first capacitor circuit X10 was greatly changed to 13.6 nF, and the effective value of the alternating voltage generated in metal portion SD measured by measuring portion VSG1 was 26.5V. That was, the effective value of the alternating voltage generated in metal portion SD changed from 0.2V in the state without fault in a plurality of capacitor elements to 26V or higher, thus, it could be confirmed that the short fault of a single multilayer ceramic capacitor could be detected reliably. In Example 2, the combined electrostatic capacity of first capacitor circuit X10 was 14.4 nF and was changed more greatly than Example 1. The effective value of the alternating voltage generated in metal portion SD measured by measuring portion VSG1 was 62V. That was, the effective value of the alternating voltage generated in metal portion SD changed from 0.2V in the state without fault in a plurality of capacitor elements to 61V or higher, thus, it could be confirmed that the short faults of only two multilayer ceramic capacitors could be detected reliably. In Example 3, the combined electrostatic capacity of first capacitor circuit X10 was 15.4 nF and was changed more greatly than Example 1 and Example 2. The effective value of the alternating voltage generated in metal portion SD measured by measuring portion VSG1 was 105.7V. That was, the effective value of the alternating voltage generated in metal portion SD changed from 0.2V in the state without fault in a plurality of capacitor elements to 105V or higher, thus, it could be confirmed that the short faults of only three multilayer ceramic capacitors could be detected reliably. From the above results, it could be confirmed that, according to the present embodiment, the short fault in the plurality of capacitor elements constituting the capacitor circuit could be detected reliably. Further, the present examples showed that the short fault in the plurality of capacitor elements could be detected. However, even if it is an open fault, the change of the electrostatic capacity based on the fault could be shown as the change of the electric potential in the metal portion, thus, it was sure that the fault could be detected reliably.

DESCRIPTION OF REFERENCE NUMERALS

100 . . . wireless power feeding device; 110 . . . power supply; 120 . . . power conversion circuit; 121 . . . power conversion portion; 122 . . . switch drive portion; 130 . . . power feeding coil device; 200 . . . wireless power receiving device; 210 . . . power receiving coil device; 220 . . . rectification portion; CO . . . smoothing condenser;

D1~D4 . . . diode; RL . . . load; S1 . . . wireless power transmission device; SG1~SG4 . . . SW controlling signal; SW1~SW4 . . . switching element; GND1 . . . ground; FGND1 . . . frame ground; RG1~RG4 . . . voltage dividing resistor; Lu1 . . . coil device; L1 . . . coil for power transmission; C12,C13 . . . parasitic capacitance; X1, X10, X11 . . . capacitor circuit; SD . . . metal portion; VSG1 . . . measuring portion; PCBX10, PCB1 . . . substrate; CAP1 . . . capacitor element; CUT, CUT 1, CUT 22, CUT 23 . . . copper foil; TMNLX10, TMNL1 . . . terminal; VSGR1 . . . resistor; VSGM1 . . . alternating voltage meter; AD1 . . . analog-to-digital converter portion; COM1 . . . wireless communication portion; MLCC13 . . . capacitor group; FC13 . . . capacitor portion.

What is claimed is:

1. A coil device comprising,
a coil for power transmission,
a capacitor circuit connected to the coil for power transmission and having a plurality of capacitor elements,
a conductive metal portion which is disposed close to the coil for power transmission, and
a measuring portion connected to the conductive metal portion for measuring a voltage or a current generated in the metal portion.

2. The coil device of claim 1, wherein,
the capacitor circuit comprises a first capacitor circuit which is connected to one end of the coil for power transmission and a second capacitor circuit which is connected to the other end of the coil for power transmission,
a combined electrostatic capacity of the first capacitor circuit is approximately equal to a combined electrostatic capacity of the second capacitor circuit.

3. The coil device of claim 1, wherein,
each of the plurality of capacitor elements is composed of a multilayer ceramic capacitor,
and the capacitor circuit comprises a capacitor group in which the plurality of capacitor elements are series-parallel connected.

4. The coil device of claim 1, wherein,
each of the plurality of capacitor elements is composed of a film capacitor,
and the capacitor circuit comprises a plurality of capacitor portions in which the plurality of capacitor elements are connected in series.

5. A wireless power transmission device comprising,
a wireless power feeding device including a power feeding coil device, and
a wireless power receiving device including a power receiving coil device,
at least one of the power feeding coil device and the power receiving coil device is the coil device of claim 1.

6. The coil device of claim 2, wherein,
each of the plurality of capacitor elements is composed of a multilayer ceramic capacitor,
and the capacitor circuit comprises a capacitor group in which the plurality of capacitor elements are series-parallel connected.

7. The coil device of claim 2, wherein,
each of the plurality of capacitor elements is composed of a film capacitor,
and the capacitor circuit comprises a plurality of capacitor portions in which the plurality of capacitor elements are connected in series.

8. A wireless power transmission device comprising,
a wireless power feeding device including a power feeding coil device, and
a wireless power receiving device including a power receiving coil device,
at least one of the power feeding coil device and the power receiving coil device is the coil device of claim 2.

9. A wireless power transmission device comprising,
a wireless power feeding device including a power feeding coil device, and
a wireless power receiving device including a power receiving coil device,
at least one of the power feeding coil device and the power receiving coil device is the coil device of claim 3.

10. A wireless power transmission device comprising,
a wireless power feeding device including a power feeding coil device, and
a wireless power receiving device including a power receiving coil device,
at least one of the power feeding coil device and the power receiving coil device is the coil device of claim 6.

11. A wireless power transmission device comprising,
a wireless power feeding device including a power feeding coil device, and
a wireless power receiving device including a power receiving coil device,
at least one of the power feeding coil device and the power receiving coil device is the coil device of claim 4.

12. A wireless power transmission device comprising,
a wireless power feeding device including a power feeding coil device, and
a wireless power receiving device including a power receiving coil device,
at least one of the power feeding coil device and the power receiving coil device is the coil device of claim 7.

* * * * *